(12) United States Patent
Schebitz et al.

(10) Patent No.: US 8,205,525 B2
(45) Date of Patent: Jun. 26, 2012

(54) ROTATIONAL VIBRATION DAMPER

(75) Inventors: Michael Schebitz, Attendorn (DE); Matthias Zacker, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 97 days.

(21) Appl. No.: 12/459,166

(22) Filed: Jun. 26, 2009

(65) Prior Publication Data
US 2010/0000833 A1 Jan. 7, 2010

(30) Foreign Application Priority Data

Jul. 4, 2008 (DE) .................. 10 2008 031 419

(51) Int. Cl.
*F16F 15/12* (2006.01)
(52) U.S. Cl. ................................... 74/574.4
(58) Field of Classification Search ........... 74/573.12, 74/574.3, 574.4; 474/94, 152, 166, 902; 464/40, 57, 58, 59, 60, 62.1, 64.1
See application file for complete search history.

(56) References Cited

U.S. PATENT DOCUMENTS

| 768,883 | A | * | 8/1904 | Nelson | 464/59 |
| 2,939,561 | A | * | 6/1960 | Rudisch | 192/84.92 |
| 4,103,516 | A | * | 8/1978 | Marcin | 198/781.02 |
| 5,879,237 | A |  | 3/1999 | Ishihara |  |
| 6,253,633 | B1 | * | 7/2001 | Mott | 74/411 |
| 2005/0000767 | A1 |  | 1/2005 | Herrmann |  |
| 2007/0021250 | A1 | * | 1/2007 | Spintzyk | 474/94 |
| 2007/0060395 | A1 |  | 3/2007 | Asbeck et al. |  |
| 2008/0312015 | A1 |  | 12/2008 | Schebitz et al. |  |

FOREIGN PATENT DOCUMENTS

| DE | 19839470 A1 | 3/1999 |
| DE | 102006043621 A1 | 4/2007 |
| EP | 1092501 A2 | 4/2001 |
| EP | 1279807 A1 | 1/2003 |
| FR | 2735196 A1 | 12/1996 |
| GB | 2152190 A | 7/1985 |
| GB | 2390885 A | 1/2004 |
| WO | 2007057932 A1 | 5/2007 |
| WO | 2008004257 A1 | 1/2008 |

* cited by examiner

*Primary Examiner* — Vicky Johnson
(74) *Attorney, Agent, or Firm* — MacMillan, Sobanski & Todd, LLC

(57) ABSTRACT

The invention relates to a rotational vibration damper for a crankshaft of a piston engine. The rotational vibration damper comprises a hub which defines an axis of rotation, and a mass member which, via at least one spring element, is coupled to a hub and is able to rotationally vibrate freely relative to the hub. The mass member is annular in shape and is arranged coaxially relative to the hub, wherein the at least one spring element made of steel is provided in the form of a bendable spring.

8 Claims, 6 Drawing Sheets

ROTATIONAL VIBRATION DAMPER

BACKGROUND OF THE INVENTION

The invention relates to a rotational vibration damper for attachment to the crankshaft of a piston engine, such as an internal combustion engine. The invention provides a crankshaft assembly with a rotational vibration damper. Rotational vibration dampers serve to absorb any vibrations in amplitude and frequency which occur in the piston engine during the various stages of energy conversion. Vibrations are the result of torque and speed curves which are discontinuous in terms of time and non-uniform and which occur as a function of the number of cylinders, the combustion process, the number of operating cycles and the ignition time.

Rotational vibration dampers commonly comprise a mass and a spring element are intended to have the specific effect of compensating for exciter forces or exciter moments, so that certain frequencies or certain frequency ranges of individual parts of the crankshaft remain at rest or vibrate to a much reduced extent.

DE 101 26 477 C1 describes a rotational vibration damper in the form of a so-called shear gap absorber.

DE 10 2006 043 621 A1 describes a rotational vibration damper for a crankshaft of a piston engine. This rotational vibration damper comprises a housing which is attached to the crankshaft, as a well as centrifugal mass which is coupled via spring elements to the housing. The spring elements are provided in the form of pretensioned helical pressure springs which are received in circumferentially extending windows of the housing.

DE 10 2005 055 034 A1 discloses a torsional vibration damper with wound wire springs in a driving disc, with one end of the wire springs being rotationally fixed to a hub and with the other end being rotationally fixed to the disc rim of the driving the disc. It is thus possible, via the wire springs, to transmit torque between the hub and the disc rim.

OBJECT OF THE INVENTION

It is the object of the present invention to propose a rotational vibration damper for a crankshaft of a piston engine, which comprises a simple design and a low weight and which ensures reliable absorption of rotational vibrations of the rotating component. A further object consists in providing a crankshaft assembly which has such a rotational vibration damper.

SUMMARY OF THE INVENTION

A rotational vibration damper for a crankshaft of a piston engine comprises hub which defines an axis of rotation A, and a mass member which, via at least one spring element, is coupled to the hub and is able to rotationally vibrate freely relative to the hub. The mass member is annular in shape and is arranged coaxially relative to the hub, wherein the at least one spring element is made of steel and is provided in the form of a bendable spring.

The inventive rotational vibration damper is advantageous in that it consists of only a few parts and is therefore easy to produce. At the same time, at least one bendable spring with which the mass member is coupled to the hub, ensures reliable damping or absorption of the rotational vibrations on the rotating component. The rotational vibration dampers are therefore particularly suitable for being used at a crankshaft of a piston engine. For this purpose, the hub is firmly connected either directly or indirectly, e.g. via a belt pulley, to the crankshaft, so that the rotational vibration damper rotates jointly with the crankshaft.

An alternative application consists in attaching the rotational vibration damper to an disconnected belt pulley for damping or absorbing rotational vibrations. Preferably, the mass member is connected only to one spring element. No further element or component is connected to the mass member, which could brake or inhibit a free rotational vibration of the mass member.

Bendable springs—as implied by the name—are spring elements which are designed or built into the rotational vibration damper in such a way that they are subjected to bending loads. The bendable springs permit a compact design and good damping properties. They are produced from a metallic material, preferably from spring steel which is characterized by a high degree of elasticity and strength. The mass member is preferably provided in the form of a closed ring which is arranged coaxially relative to the axis of rotation. To that extent, the mass member can also be referred to as a flywheel. To ensure that the mass member generates only small amounts of out-of-balance force, it is preferably rotationally symmetric, and circular-ring-shaped. In principle, it is also conceivable for the mass member to be composed of an open ring or in the form of two or more annular portions.

The rotational vibration damper functions as follows: if the rotating component, e.g. the crankshaft or the belt pulley rotates uniformly, the mass member is moved along jointly with the rotating component, without vibrating rotational movements. If slight superimposed vibration deflections occur, there will be a relative movement between the mass member and the hub. These rotational vibrations are displaced by the rotational vibration damper into the frequency range of the idling speed of the piston engine and are thus in the uncritical frequency range. The natural frequency of the rotational vibration damper is designed to be such that it equals the exciter frequency of the rotating component or of the starting system. In this way, the vibrations of the rotating component are eliminated. Depending on the number and arrangement of the cylinders, the main exciter frequencies of the crankshaft of the internal combustion engine range between 200 and 600 Hz. The natural frequency of the rotational vibration damper has to correspond to this value, so that the rotational vibrations of the staring system can be absorbed.

According to this first embodiment, the bendable spring extends in the circumferential direction around the hub, more particularly over at least 270°. More particularly, the bendable spring can be provided in the form of a leg spring which extends over less than a full circumference, or in the form of a spiral spring which extends over more than one complete circumference. The leg spring, like the spiral spring, is subjected, around its axis, to bending. Both spring elements are wound bending springs wherein, independently of the diameter of the winding, the outer movement affects the spring wire in the form of a constant bending moment over the entire wire length of the winding. The necessary change in the winding diameter as a result of rotational movement and the mass member relative to the hub and, respectively, the rotational vibrations therefore has little influence on the linearity of the bendable spring.

If the spring element is a spiral spring, a first end of the spiral is preferably connected to the hub, with a second end of the spiral being connected to the mass member. The spiral spring preferably extends over at least 360°, more particularly approximately over 540° around the axis of rotation. More particularly, the spiral spring may comprise a first contact portion by means of which it is in planar contact with an outer circumferential face of the hub, as well as a second contact portion by means of which it is in planar contact with an inner circumferential face of the mass member. A free transition portion is positioned between the first contact portion and the second contact portion and which is not in contact with the hub or the mass member. To ensure good spiral spring support it is advantageous if at least one of the contact portions extends over a circumference of at least 180°, so that it is in contact with the hub and, respectively, with the mass member. The transition portion should extend over at least 90°. According to a preferred embodiment, the windings of the spiral spring are positioned in one plane. However, they can also extend in a plurality of planes.

According to a further embodiment, the bendable spring, in a axial view, is provided in the form of a wave-shaped ring which is arranged coaxially relative to the hub, with the wave-shaped bendable spring being arranged in the annular chamber between the outer circumferential face of the hub and the inner circumferential face of the mass member. The wave-shaped bendable spring meanders around a circular-ring-shaped spring center line. The wave-shaped spring element comprises inner turning portions of which at least some are in planar contact with the hub, as well as outer turning portions of which at least some are in planar contact with the mass member. Furthermore, it is proposed that the wave-shaped bendable spring, at least via one circumferential region, is connected to the hub, for instance by welding or by a form-locking connection, and that the wave-shaped bendable spring, at least via one circumferential region, is firmly connected to the mass member.

The remaining turning portions which are not firmly connected to the hub and, respectively, to the mass member, but are in contact with same, have a damping effect due to the friction forces. The turning portions can, in principle, have any shape, for instance they can be rounded, thus producing a sinusoidal profile, or they can be discontinuous, thus producing a saw tooth profile. The wave-shaped bendable spring is preferably continuously closed. However, the wave-shaped bendable spring may be open or slotted. The number of waves is optimal and depends on the spring stiffness requirements.

According to a further embodiment there is provided a plurality of shorter bendable springs which are distributed around the circumference. On the one hand, they are firmly connected to the mass member and on the other hand to the hub. The bendable springs are each preferably provided in the form of an open ring, but closed rings may also be used. The opening or slot of the bending springs is more particularly arranged in the radial inside, so that the contact portion located opposite the slot is firmly connected to the inner circumferential face of the mass member. Further advantageous damping conditions combined with a small radial installation space are achieved if, in a plan view, the bendable springs comprise an oval contour, with the bendable spring being built in such a way that the greater diameter extends in the circumferential direction of the hub. The measured dimensions of the bendable springs are preferably such that the greater diameter is smaller, preferably smaller by a multiple, than the outer diameter of the wheel hub.

According to a preferred embodiment which applies to all the above-mentioned embodiments, the hub is cup-shaped and comprises an outer annular web to which there is fixed that at least one bendable spring. For fixing purposes, the one bendable spring can be connected to the hub in a material-locking or form-locking way. Material-locking way means non-releasable connections wherein separation can only be achieved by destroying the connected parts, such as welding or soldering connections. Form-locking connections are those wherein the contours of the parts to be connected are such that they engage one another and that the forces occurring between the parts to be connected are supported at the contact faces, one example for a form-locking connection in the case of the wave-shaped bendable spring being that the outer face of the hub and the inner face of the mass member comprise a contour which can be engaged by the turning portions of the wave-shaped bendable spring, so that they are secured relative to one another against relative rotation. According to an embodiment comprising a plurality of bendable springs, the hub comprises circumferentially distributed windows in which there are located the bendable springs.

The bendable springs are produced from a flat material or round material, and this applies to all the above-mentioned embodiments. A bendable damping produced from a flat material can also be referred to as a band spring which, more particularly, is characterized by the thickness of the spring band being by a multiple smaller than the width of the spring band. To achieve a simple design of the rotational vibration damper it is advantageous if the hub and the mass member are connected to one another only by the at least one bendable spring. However, in principle, it is also conceivable for further springing elements or damping elements to be effective between the hub and the mass member, but in any case, no further elements are attached to or connected to the outside of the mass member, so that the mass member is able to rotationally vibrate freely relative to the hub.

BRIEF DESCRIPTION OF THE DRAWINGS

Preferred embodiments will be explained below with reference to the following Figures:

FIG. 1 shows an inventive rotational vibration damper in a first embodiment
 a) in a longitudinal section
 b) in an axial view
 c) in a cross-sectional view according to sectional line C-C of FIG. 1a.

DETAILED DESCRIPTION

Figure 1A:
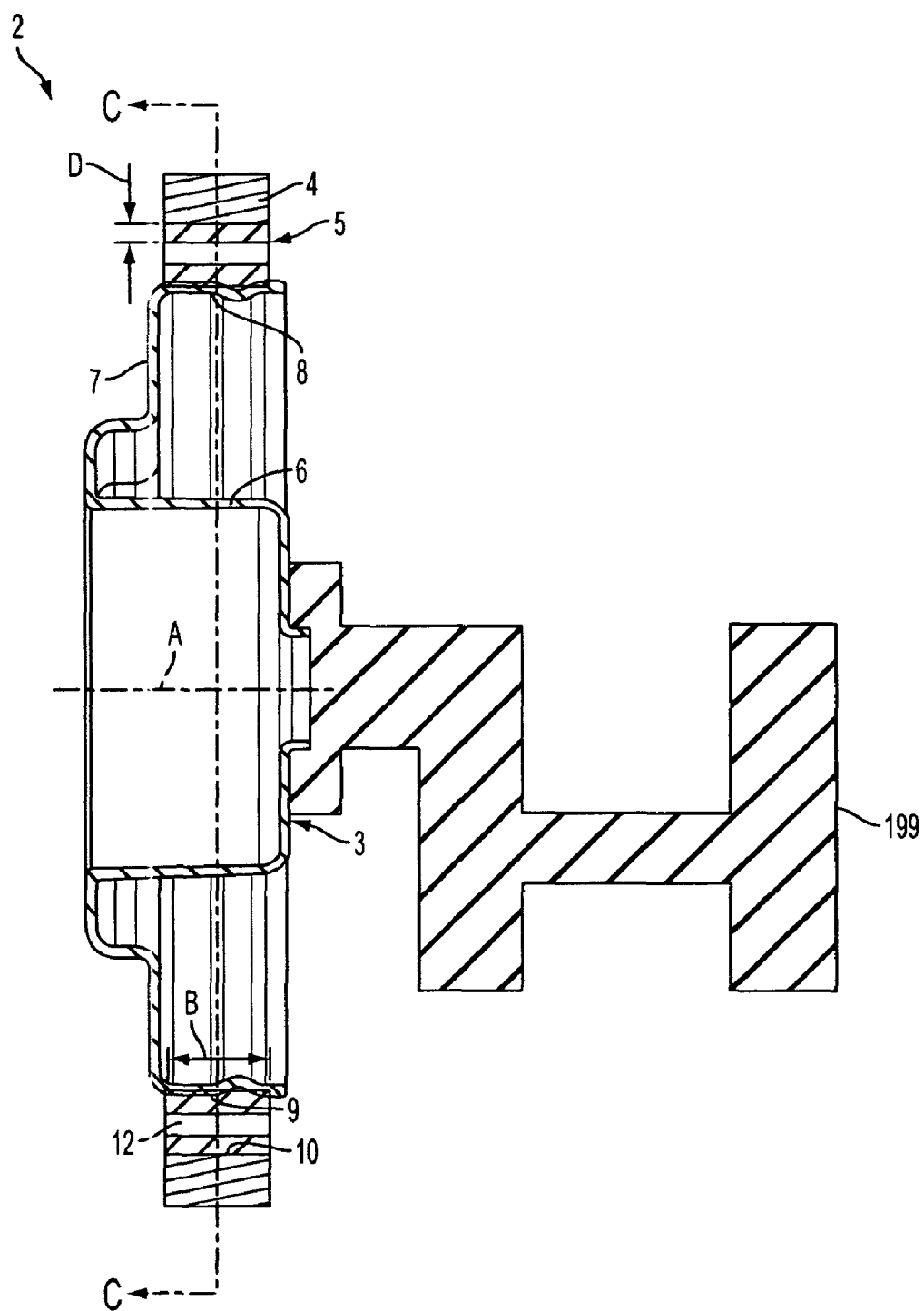
Figure 1B:
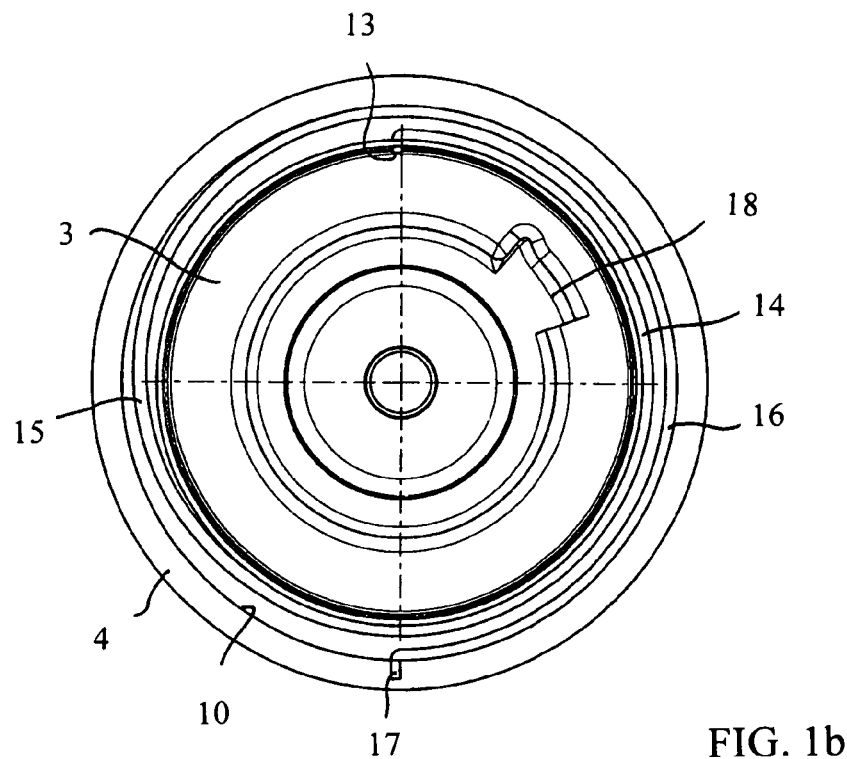
Figure 1C:
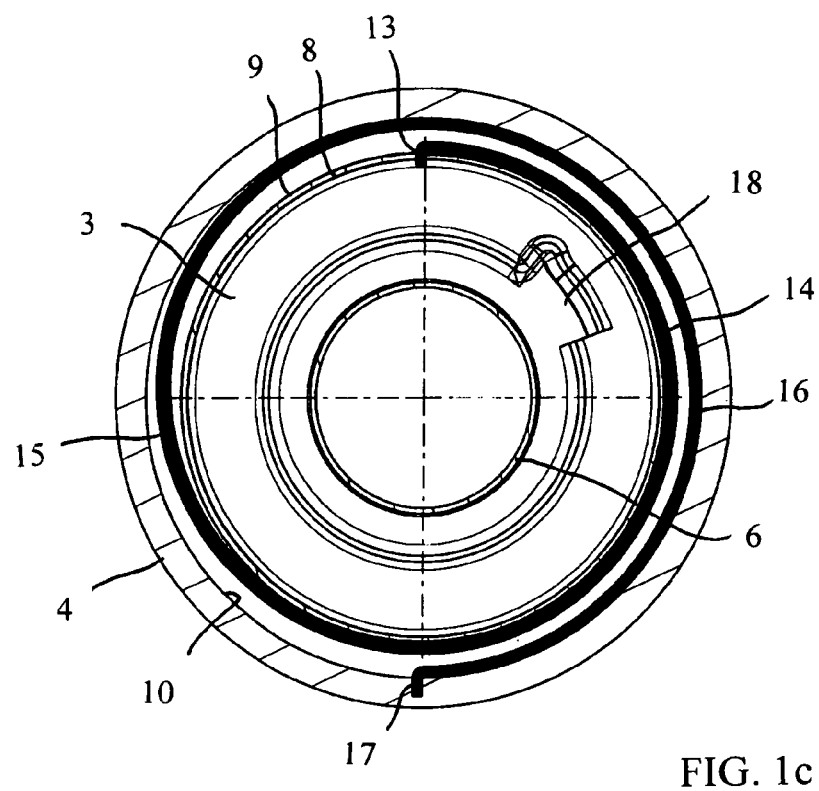

FIGS. 1a to 1c described jointly below show a rotational vibration damper 2 which is suitable to suppress torsional natural frequencies of rotating components, more particularly of crankshafts. The rotational vibration damper 2 comprises a hub 3 which defines an axis of rotation A, as well as a mass member 4 which is arranged coaxially relative to the hub 3 which is connected to the hub 3 by means of at least one spring element 5. The connection between the mass member 4 and the hub 3 is such that the mass member 4 is able to rotationally vibrate freely relative to the hub 3. More particularly, it is proposed that, with the exception of the at least one spring element 5, no further connecting elements are effective between the hub 3 and the mass member 4.

The hub 3 is cup-shaped and comprises an inner annular web 6 to provide a connection with a crankshaft 199, an adjoining radial portion 7 as well as an outer annular web 8. The outer annular web 8 comprises an approximately cylindrical outer face 9, and between said outer face 9 and an inner circumferential face 10 of the mass member 4, there is formed an annular gap 12 in which there is received the spring element 5.

In the present embodiment, the spring element 5 is provided as a bendable spring in the form of a spiral spring which extends over approximately 540° around the hub 3. The spiral spring 5 comprises an inwardly crimped first end 13 which engages a corresponding recess of the hub 3, an adjoining contact portion 14 which extends over more that 180° and is in planar contact with the outer circumferential face 9 of the hub 3. Furthermore an adjoining transition portion 15 is not in contact with the hub 3 or with the mass member 4. An adjoining second contact portion 16 with a greater radius extends over more than 180° and is in planar contact with the inner circumferential face 10 of the mass member 4. A second end 17 of the spiral spring is crimped outwardly and, in form-locking way, engages a corresponding recess of the mass member 4. It can be seen that the mass member 4 is provided in the form of a continuously closed ring which is arranged coaxially relative to the hub 3. To that extent, the mass member 4 can also be referred to as a flywheel, with the contact portion 16 of the spiral spring 5 serving to coaxially center the mass member 4 relative to the hub 3.

As is particularly obvious in FIG. 1*a*, the spring element 5 is produced from a flat material, i.e. the thickness D of the spiral spring is substantially smaller than the width B of the spiral spring. To that extent, the spring element 5 can also be referred to as a spiral-shaped band spring.

In a circumferential region radially outside the inner annular web 6, the hub 3 comprises a formation 18 which can be engaged by a corresponding driving element of a belt pulley (not illustrated) to provide a rotationally fast connection. The belt pulley, in turn, is connected to the crankshaft in a rotationally fast way and, via a driving belt, drives the auxiliary units of the motor vehicle.

Figure 2B:
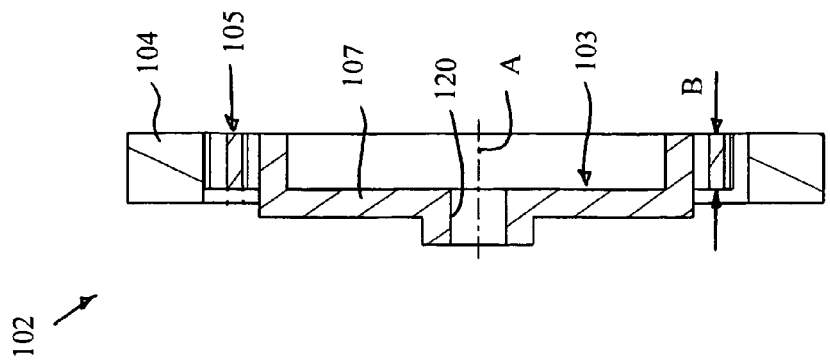
FIG. 2 shows an inventive rotational vibration damper in a second embodiment
 a) in an axial view
 b) in a longitudinal section.
Figure 2A:
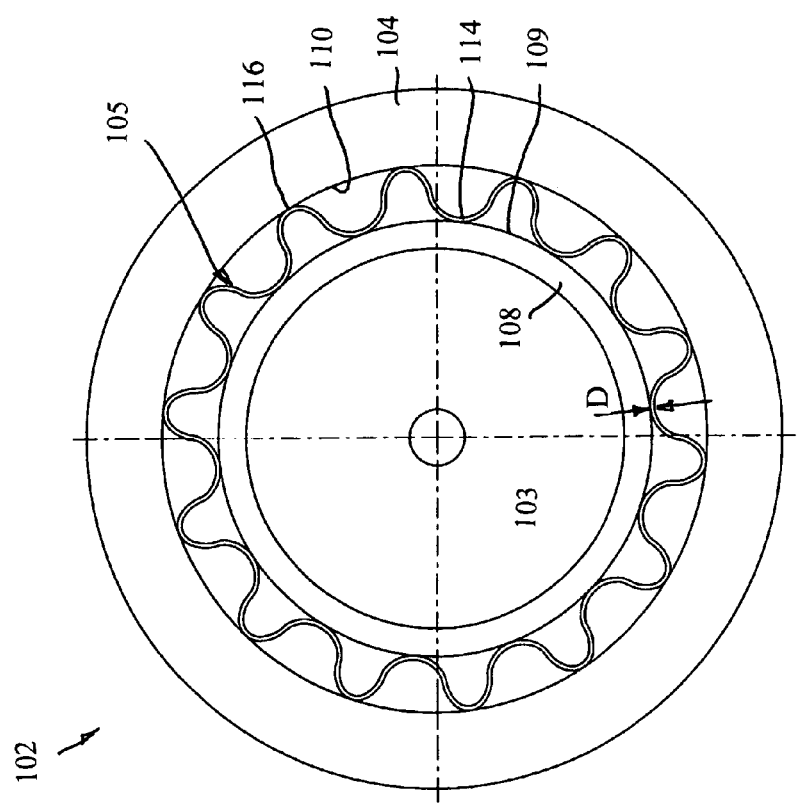

FIGS. 2*a* and 2*b*, which will be described jointly below, show a rotational vibration damper 102 in a further embodiment which, in respect of its design and made of functioning, largely corresponds to that shown in FIG. 1, so that, as far as common features are concerned, reference is made to the above description, with the reference numbers of those components which are identical to or correspond to those shown in FIG. 1 having been increased by 100. The special features of the present embodiment will be described below.

It can be seen that, in an axial view, the spring element 105 is provided in the form of a wave-shaped bendable spring. The wave-shaped bendable spring 105 comprises outer first turning portions 116 which are in contact with the inner circumferential face 110 of the mass member 104, as well as inner turning portions 114 which are in contact with the outer circumferential face 109 of the hub 103. The inner and outer turning portions 114, 116 alternate around the circumference, with the bendable spring "meandering" around an imaginary annular spring center line.

Depending on the required spring stiffness, it is possible for one or several inner circumferential portions 114 to be firmly connected to the hub 103, for example via a form-locking or material-locking connection. The same applies to the outer circumferential portions 116 of which at least one is firmly connected to the mass member 104. The remaining turning portions 114, 116 which are not firmly connected to the respective component, i.e. the hub and mass member respectively, are in planar contact with same. In this way, if rotational vibrations occur, there are generated friction forces between the hub 103 and the inner turning portions 114 on the one hand and between the outer turning portions 116 and the mass member 104 on the other hand, which friction forces have a damping effect. This has an advantageous effect on the absorption characteristics of the rotational vibration damper 102. If only a low degree of spring stiffness is required, the number of connecting points is small. If, on the other hand, a high degree of spring stiffness is required, the wave-shaped bendable spring 105 is firmly connected in several regions around the circumference to the hub 103 and the mass member 104 respectively.

In the present embodiment, the firm connection between this bendable spring 105 and the mass member 104, and hub 103 respectively, is achieved by a material locking connection, more particularly by welding. However, it is also conceivable that the hub 103, and the mass member 104 comprise an outer circumferential face 109 adapted to the contour of the wave-shaped bendable spring 105 and, respectively an inner circumferential face 110 which can be engaged by the bendable spring 105 by means of its outer and, respectively, inner circumferential portions 114, 116 in a form-locking way. It can be seen in FIG. 2*b* that the present bendable spring 105 is also produced from a flat material, i.e. it comprises a width B which is clearly greater than the thickness D. In principle, it is also conceivable for the bendable spring to be produced from a round material. In its inside, the hub 103 comprises a center bore 120 by means of which it can be fixed to the belt pulley and, respectively to the crankshaft (not illustrated). Depending on the required spring characteristics, it is proposed that one or several reversed portions may or may not be in planar contact with the respective circumferential face.

Figure 3B:
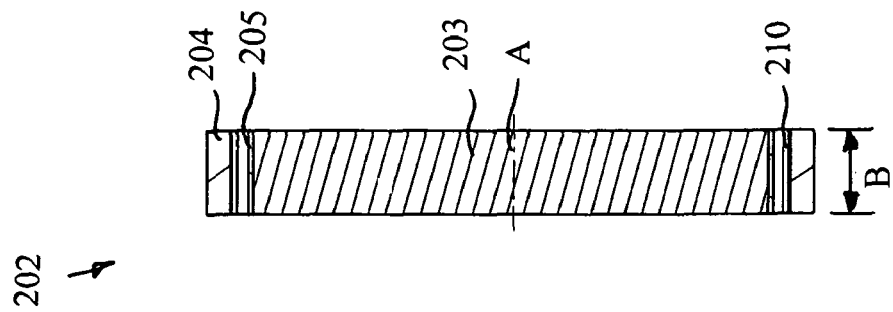
FIG. 3 shows a rotational vibration damper in a third embodiment
 a) in an axial view
 b) in a longitudinal section.
Figure 3A:
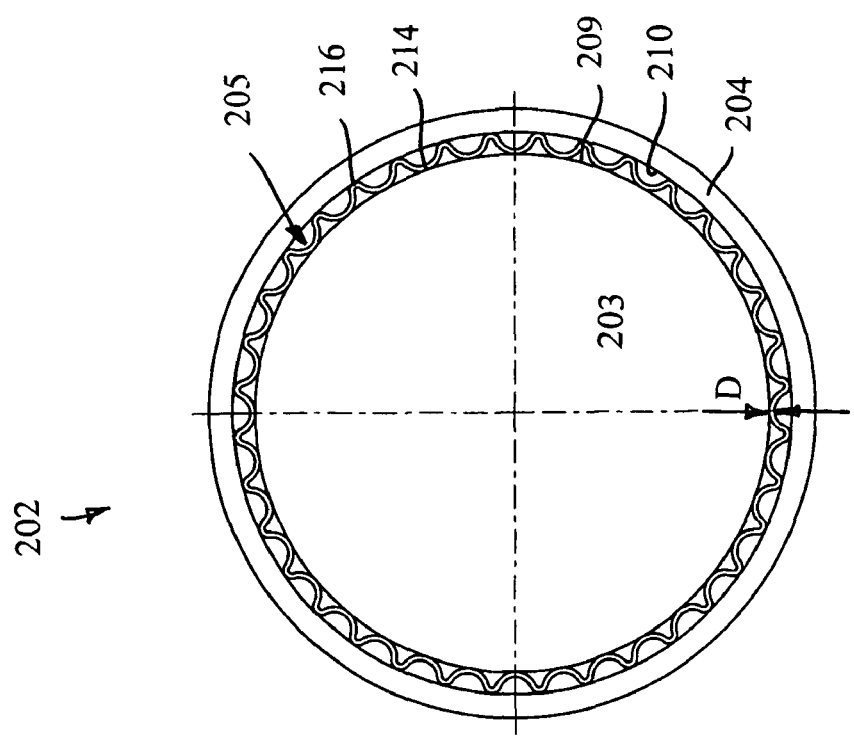
Figure 4B:
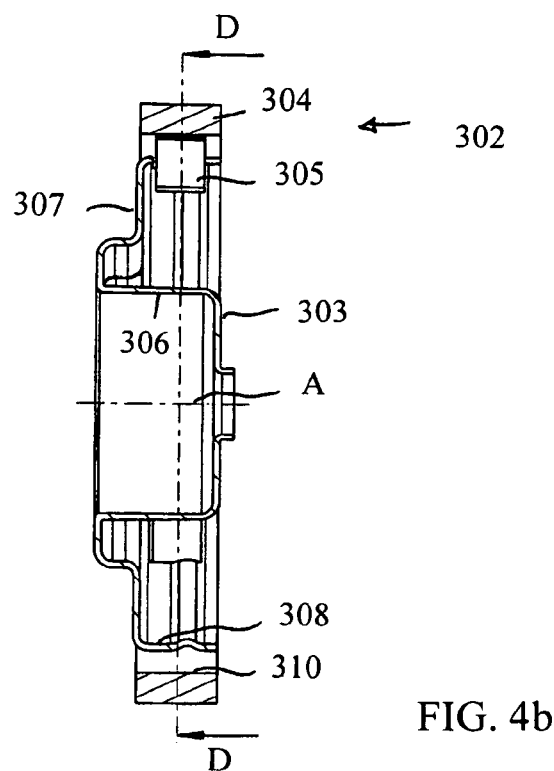
FIG. 4 shows an inventive rotational vibration damper in a fourth embodiment
 a) in a perspective view
 b) in a longitudinal section
 c) in an axial view and
 d) in a cross-sectional view according to sectional line D-D of FIG. 4b.
Figure 4A:
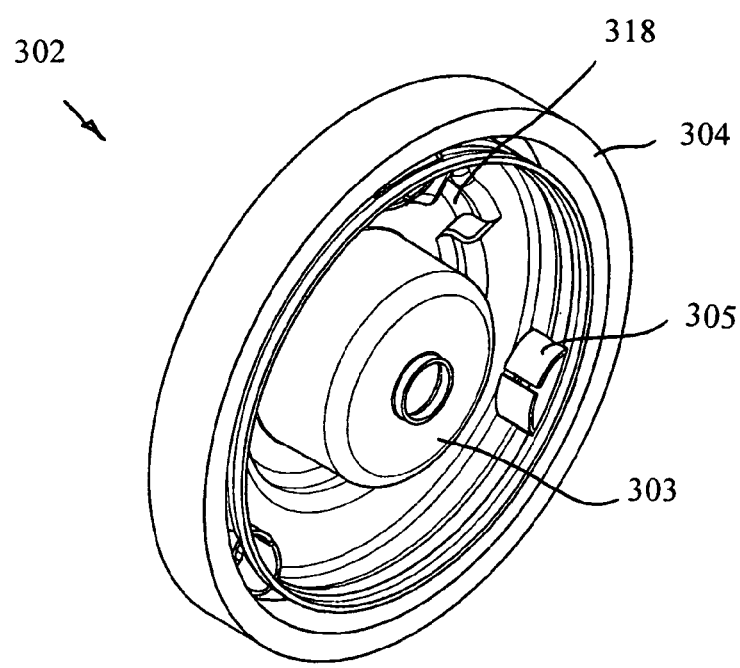
Figure 4C:
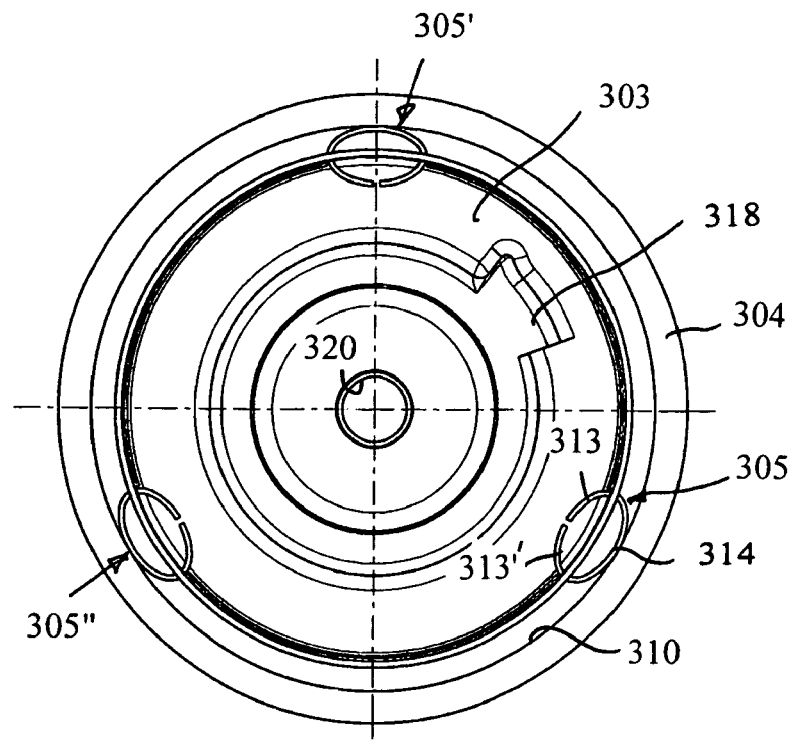
Figure 4D:
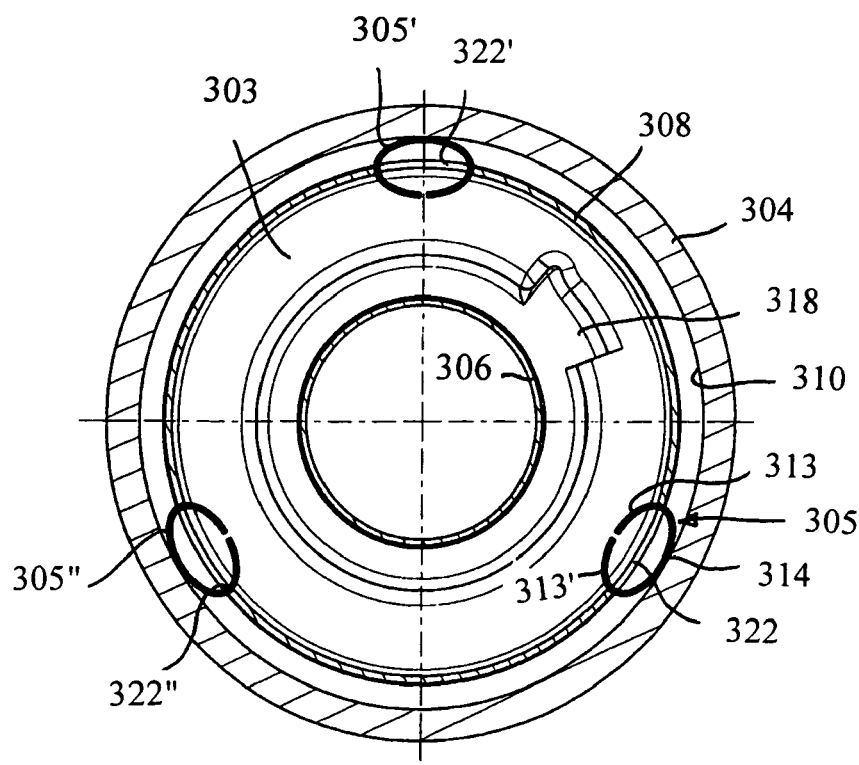

The rotational vibration damper 202 diagrammatically illustrated in FIGS. 3*a* and 3*b* largely corresponds to that shown in FIG. 2, so that reference is made to the above description with the reference numbers of components identical to or corresponding to components shown in FIG. 2 again having been increased by 100.

The only difference consists in the design of the wave-shaped bendable spring 205 which clearly comprises more circumferentially distributed inner and outer turning portions 214, 216. The radial distance between the outer circumferential face 209 of the hub 203 and the inner circumferential face 210 of the mass member is smaller than in the embodiment according to FIG. 2. A further difference consists in that the inner turning portions 214 comprise a great radius than the outer turning portions 216. Because the individually selected design of the wave-shaped bendable spring 205, the vibration behavior and the absorption behavior of the rotational vibration damper 202 can be adapted to the relevant requirements. The hub 203 is only shown diagrammatically, but normally also comprises fixing means for attaching a belt pulley or a crankshaft. The present bendable spring, too, is produced from a flat material, but an embodiment in round steel may also be used.

FIG. 4*a* to 4*d*, which will be described jointly below, show an inventive rotational vibration damper 302 in further embodiment which in many ways corresponds to that according to FIG. 1 and to which reference is hereby made, with the reference numbers of those components which are identical to or correspond to those shown in FIG. 1 having been again increased by 100. The special features of the present embodiment will be described below.

The present rotational vibration damper 302 is characterized in that a plurality of shorter bendable springs 305 is arranged at the hub 303 for the purpose of connecting the mass member 304 to the hub 303. They each extend over only a small part of the circumference of the hub 303, with a plurality of the bendable springs 305 being circumferentially distributed. More particularly, a greatest diameter of the bendable springs 305 is smaller than a circumferential extension of the hub 303 of 45°. In the present embodiment there are provided exactly three bendable springs 305, which is advantageous for centering the mass member 394 relative to the hub 303. Other bendable springs 305 may be used, i.e. two, four or more bendable springs, but means of which the spring stiffness can be adapted to the relevant requirements. The individual bendable springs 305 are approximately C-shaped and constitute an open ring, with the free ends 313, 313' of the bendable springs 305 being directly radially inwardly and with the intermediate portion 314 arranged therebetween being in contact with the inner circumferential face 310 of the mass member 304. The individual bendable springs 305 in the contact region may be firmly connected to the inner circumferential face 310 of the mass member 304, for example by welding.

It can be seen that the individual bendable springs 305, 305', 325", which, in a plan view, have an oval contour, are received in individual windows 322, 322', 322" of the hub 303. The windows 322 are circumferentially distributed in the outer annular web 308 of the hub 303, with the two legs 313,313' of the bendable springs 305 being circumferentially supported with pretension against the wall portions laterally delimiting the window 322. In a plan view, the bendable springs 305 comprise an oval contour, with the greater diagonal of the oval extending in the circumferential direction. In this way, the installation space of the rotational vibration damper is kept small The above inventive rotational vibration dampers comprise a simple design and ensure reliable damping and absorption of rotational vibrations. Because the spring elements are always provided in the form of bendable springs, the torque acting from the outside on to the spring element, in the spring wire itself, acts as a constant bending moment along the entire wire length. This is the reason why a slight change in the winding diameter as a result of twisting has little influence on the linearity of the bendable spring, so that good damping characteristics are achieved.

The invention claimed is:

1. A rotational vibration damper for a crankshaft of a piston engine, comprising:
    a hub which defines an axis of rotation, and
    a mass member which, via at least one spring element, is coupled to said hub and is able to rotationally vibrate freely relative to said hub,
    wherein said mass member is annular in shape and is arranged coaxially relative to the hub, and is connected only to said at least one spring element, and
    wherein said at least one spring element is made of steel and is provided in the form of a bendable spring, and
    wherein said bendable spring extends around the hub at least over 360° in the circumferential direction.

2. A rotational vibration damper according to claim 1, wherein said bendable spring is arranged spirally around the hub and is connected by means of a first end portion to the hub and by means of a second end portion to the mass member.

3. A rotational vibration damper according to claim 1, wherein said bendable spring comprises a first contact portion by means of which it is in first planar contact with an outer circumferential face of said hub, as well as a second contact portion by means of which it is in planar contact with an inner circumferential face of said mass member, as well as a transition portion connecting said first contact portion and the second contact portion, wherein at least one of said first and second contact portions extends over a circumference of at least 180°.

4. A rotational vibration damper according to claim 1, wherein said hub is cup-shaped and comprises an outer annular web to which there is secured said one bendable spring.

5. A rotational vibration damper according to claim 1, wherein said one bendable spring is locked to said hub.

6. A rotational vibration damper according to claim 1, wherein said one bendable spring is locked to said mass member.

7. A rotational vibration damper according to claim 1, wherein said hub and said mass member are connected to one another only by means of said at least one bendable spring.

8. A rotational vibration damper according to claim 1, having a crankshaft assembly and said hub of said rotational vibration damper is connected to said crankshaft.

* * * * *